United States Patent [19]

Yamada

[11] Patent Number: 4,710,012
[45] Date of Patent: Dec. 1, 1987

[54] FLASH PHOTOGRAPHY SYSTEM
[75] Inventor: Masanori Yamada, Sagamihara, Japan
[73] Assignee: Canon Kabushiki Kaisha, Tokyo, Japan
[21] Appl. No.: 828,960
[22] Filed: Feb. 12, 1986
[30] Foreign Application Priority Data Feb. 14, 1985 [JP] Japan ................. 60-027193

[51] Int. Cl.⁴ .............................................. G03B 15/05
[52] U.S. Cl. ..................................... 354/415; 354/416; 354/149.1
[58] Field of Search ............ 354/415, 416, 417, 149.1, 354/423; 315/241 P; 362/4, 16, 17, 18

[56] References Cited
U.S. PATENT DOCUMENTS

| 4,465,353 | 8/1984 | Yoshida et al. | 354/415 |
| 4,484,807 | 11/1984 | Kataoka et al | 354/415 |
| 4,501,481 | 2/1985 | Kataoka et al. | 354/415 X |
| 4,512,644 | 4/1985 | Yoshida | 354/149.1 |
| 4,542,974 | 9/1985 | Yoshikawa et al. | 354/415 |
| 4,547,057 | 10/1985 | Kataoka | 354/415 |
| 4,572,644 | 2/1986 | Kataoka et al. | 354/415 |
| 4,610,525 | 9/1986 | Yoshida et al. | 354/415 |

Primary Examiner—W. B. Perkey
Attorney, Agent, or Firm—Toren, McGeady & Associates

[57] ABSTRACT

In a flash photography system which controls the amount of flash based on an aperture value of a lens set by detecting reflected light from an object which is preliminarily illuminated prior to main illumination, the angle of illumination coverage of a main light issuing portion is variable, and the amount of light from the preliminary illumination is determined corresponding to that varied angle. The aperture value of the lens is properly set by the preliminary illumination corresponding to that varied angle.

19 Claims, 4 Drawing Figures

FLASH PHOTOGRAPHY SYSTEM

BACKGROUND OF THE INVENTION

1. Field of the Invention

This invention relates to flash photography systems, and more particularly to flash photography systems in which an aperture value is determined by preliminary illumination and the amount of main illumination is controlled in accordance with that aperture value.

2. Description of the Prior Art

The electronic flash device in which the aperture of the photographic lens is determined in correspondence to the received amount of the reflection of the preliminary illumination, and the main illumination is controlled at a corresponding critical level to that aperture value, has already been proposed in Laid-Open Patent Application No. SHO 58-102221 in Japan. Also, in this kind of electronic flash devices, there have been previous proposals for using annular illumination coverage varying means in the main flash issuing portion alone, or in combination with another angular illumination coverage varying means in the preliminary light issuing portion. In the latter case, the angle of illumination coverage by the preliminary light issuing portion is made to vary in response to operation of varying the angle of illumination coverage of the main flash light issuing portion so that the preset aperture value by the preliminary illumination always coincides with the electronic flash photographable range of the main illumination. Yet, the aforesaid main illumination coverage angle varying means and the aforesaid preliminary illumination coverage angle varying means of the conventional device each are constructed by an optical member such as a lens, or diffusion plate provided in front of the light issuing portion, and the optical member of the aforesaid preliminary light issuing portion is arranged to move in response to the illumination coverage angle varying means when the aforesaid optical member of the main light issuing portion moves.

Meanwhile, the size of the main light issuing portion itself in this kind of electronic flash device is very large compared with the preliminary light issuing portion. So, the aforesaid movements of the main and preliminary light issuing portions are largely different from each other. Therefore, a problem arose that there was need to use a very complicated linking mechanism between the illumination coverage angle varying means of the main light issuing portion and that of the preliminary light issuing portion.

SUMMARY OF THE INVENTION

An object of the present invention is to provide an electronic flash device which has overcome the above-described problem and which is, despite the illumination coverage angle of the main light issuing portion being varied by the illumination coverage angle varying means, able to determine the amount of light for the preliminary illumination corresponding to that varied angle to properly set an aperture value of a lens, while still permitting the structure of construction to be simplified.

Under such an object, the invention of this application is to provide for the flash photography system having main light issuing means for producing main illumination for exposure and preliminary light issuing means for producing preliminary illumination prior to the main illumination to obtain information for making the exposure with the main illumination, with means for varying the angle of illumination coverage with light from the main light issuing means and control means for controlling the amount of emitted light from the preliminary light issuing means to vary the object light amount in accordance with the angle of illumination coverage of said illumination coverage angle varying means.

Other objects of the invention will become apparent from the following description of preferred embodiments thereof by reference to the accompanying drawings.

DETAILED DESCRIPTIN OF THE PREFERRED EMBODIMENTS

Figure 1A:
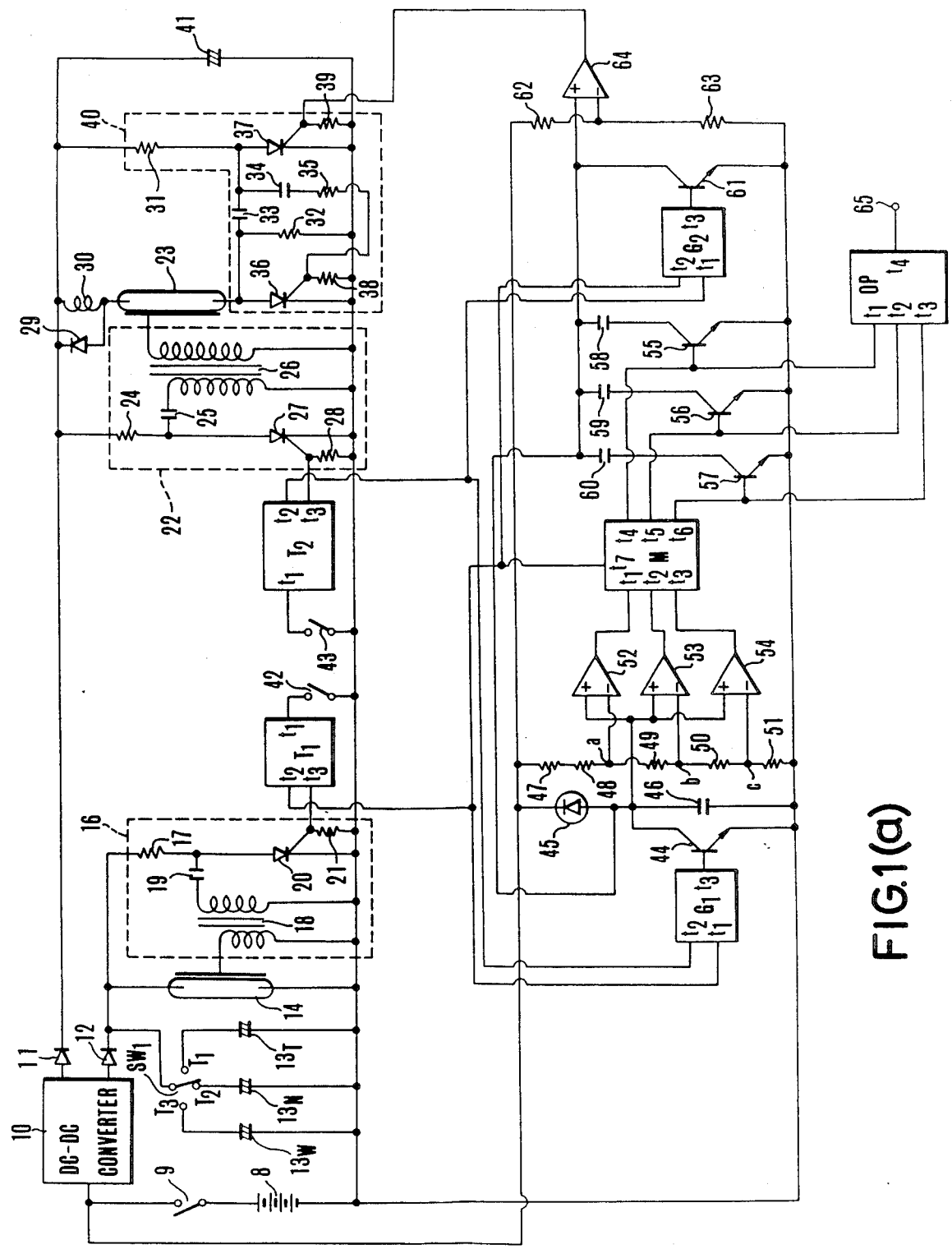
FIG. 1(a) is an electrical circuit diagram of an embodiment of an electronic flash device according to the present invention.

In FIG. 1(a) there is shown the electronic flash device of the invention usable with a single lens reflex camera, comprising a battery 8, a power switch 9, a DC-DC converter 10 for boosting D.C. voltage, diodes 11 and 12, preliminary illumination energy storage capacitors 13W, 13N and 13T selectively usable for firing a preliminary flash discharge tube 14, a selector switch SW1 arranged to move in response to movement of an illumination coverage angle varying member of the main light issuing portion, and a trigger tigger circuit 16. This circuit comprises a resistor 17, a transformer 18, a capacitor 19, a thryistor 20 and a resistor 21. Another trigger circuit 22 is included for triggering a flash discharge tube 23 for main illumination, and comprises a resistor 24, a capacitor 25, a transformer 26, a thyristor 27, and a resistor 28. A diode 29 is connected as reversely biased in series with the discharge tube 23 for the main illumination and in parallel with an inductor 30. 31 and 32 are charging resistors for a commutation capacitor 33; 34 is a capacitor connected through a resistor 35 to the gate of a main thyristor 36; 37 is an auxiliary thyristor; 38 and 39 are resistors; 40 is a light amount control circuit; 41 is a main capacitor for firing the discharge tube 23 for the main illumination with which a flash exposure is made; 42 is a switch arranged to turn on when a shutter release buttn (not shown) is pushed down to a first stroke; 43 is a synchro switch which turns on in synchronism with the actuation of a shutter release as is known in the art T1 is a timer circuit for preliminmary illumination; T2 is a timer circuit for main illumination; G1 is a gate circuit receptive of a signal of high level from the timer circuit T1 or T2 for turning off transistor 44; 45 is a photosensitive element arranged to receive the reflected light from an object to be photographed; 46 is an integration capacitor to be charged with photo-current from the photosensitive element 45; 47–51 are resistors of a voltage divider; 52–54 are comparators; M is a memory circuit; 55–57 are transistors; 58–60 are integration capacitors; G2 is a gate circuit; 61 is a transistor whose opening-and-closing operation is controlled by the output of the gate circuit G2; 62 and 63 are resistors of a voltage divider; 64 is a comparator for turning on the auxiliary thyristor 37; OP is an aperture control signal forming circuit; 65 is an outlet at which the aperture control signal is produced to the camera side.

Figure 2A:
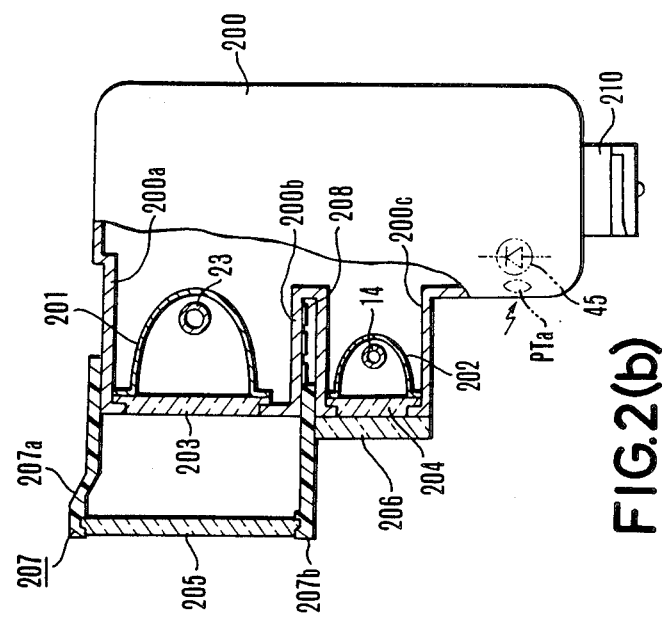
FIGS. 2(a) and 2(b) are sectional views of the flash device of FIG. 1(a) in diifferent operative positions.
Figure 2B:
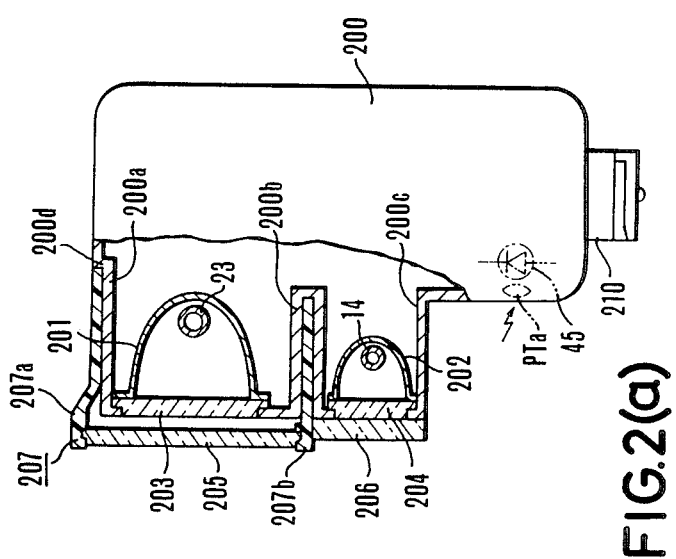

FIGS. 2(a) and 2(b) illustrate the outer appearance of the flash device. Provided in a body 200 of the flash device are the aforesaid main flash discharge tube 23 for flash photography fixedly secured to a reflector 201, the aforesaid discharge tube 14 for preliminary illumination fixedly secured to a reflector 202, and the aforesaid photo-sensitive element 45 for measuring the reflected light from the object to be photographed through a collection lens PTa. A protection panel 203 of acrylic material is positioned in front of the main light issuing portion including the main discharge tube 23 and is supported between portions 200a and 200b of a casing of the body 200. A filter 204 for transmitting only the infrared light is positioned in front of the preliminary light issuing portion including the flash discharge tube 14 for preliminary illumination so that the model to be photographed does not feel unpleasantness by the flash light issued from the discharge tube 14 for preliminary illumination. A Fresnel lens 205 for the main light issuing portion is supported between portions 207a and 207b of a casing of an adapter 207. 206 is a Fresnel lens for preliminary illumination. 207a and 207b are portions of the casing of the adapter 207 which are constructed in unified form. And, the portion 207a of the casing of the adapter 207 slidingly moves on the portion 200a of the casing of the flash device body 200 while the other portion 207b of the casing of the adapter 207 slidingly moves in a groove formed in the portion 200b of the casing of the body 200, so that the angle of illumination coverage of the main light issuing portion becomes possible to vary.

Also in the lower surface of the portion 200b of the casing of the body 200 there are push buttons 208 arranged to be selectively operated depending on the value of the illumination coverage angle of the main light issuing portion for the wide angle, standard or telephoto shooting, in other words, the axial position of the adapter 207. By the pushed state of said push buttons, it can be known that the main illumination is adapted to either wide angle, or standard, or telephoto shooting. Responsive to this pushed state, the switch SW1 selects one of the capacitors 3W, 13N and 13T.

Next explained is the operation of the flash device of construction described above. In this embodiment, the angle of illumination coverage can be varied in three steps suited to the wide angle, standard and telephoto photo objectives. When the angle of illumination coverage of the main light issuing portion is selectively set for the wide angle, normal or telephoto shooting, the illumination coverage angle varying member 207 of the main light issuing portion of FIG. 2(a) moves the switch SW1 to select the corresponding one of the capacitors 13W, 13N and 13T for preliminary illumination to the preset value of the illumination coverage angle.

Also, in general, the narrower the angle of illumination coverage of the main light issuing portion, the larger the flash light guide number. So the values of capacitance of the capacitors 13W, 13N and 13T are previously determined to be 13W<13N<13T.

At first assuming that the angle of illumination coverage of the main light issuing portion is set for the normal objective, then the switch SW1 selects the capacitor 13N for preliminary illumination. When the power switch 9 is turned on, the DC-DC converter 10 charges the capacitor 13N for preliminary illumination to a voltage high enough to fire the discharge tube 14 for preliminary illumination. Then when the shutter release button (not shown) is pushed down, the switch 42 is turned on, thereby each of the terminals t2 and t3 of the timer circuit T1 is changed to and maintained at high level for a prescribed time. Such change of the terminal t3 to high level causes the known trigger circuit 16 to operate. Then, the charge on the capacitor 13N is discharged through the flash discharge tube 14 for preliminary illumination. Thus, the discharge tube 14 starts to fire. Meanwhile, when the signal of high level from the terminal t2 of the timer circuit T1 enters the terminal t1 of the gate circuit G1, the terminal t3 of the gate circuit G1 becomes low level, turning off the transistor 44, thereby the integration capacitor 46 is rendered chargeable. The photo-sensitive element 45 converts the incident light from the object (not shown) to current with which the integration capacitor 46 is charged. The voltage stored on the integration capacitor 46 is proportional to the integrated amount of incident light from the object. The potentials at the junction points, a to c, of the voltage dividing resistors 47 to 51 are previously determined in correspondence with near, middle and far object distances, respectively. For example, for the far object distance, the integration capacitor 46 is charged to a higher voltage than the potential at the point c at a time when the firing of the preliminary light source terminates, but this voltage is lower than the potential at the point, b. Therefore, only the comparator 54 produces an output signal of high level. To the middle distance, the comparators 53 and 54 produces output signals of high level. For the near distance, all the comparators 52 to 54 produce output signals of high level. After a prescribed time from the pushing down of the shutter release button, an input at the terminal t7 of the memory circuit M from the terminal t2 of the timer circuit T1 for preliminary illumination changes from high to low level, causing the memory circuit M to memorize the input levels at the terminals t1 to t3 thereof occurring at that time. Based on the memorized input levels, one of the transistors 55 to 57 is turned on. For example, if the outputs of the comparators 52 to 54 are all high level, the transistor 55 is caused to turn on, thereby the integration capacitor 58 for the near object distance is selected. At the same time, responsive to turning on of either one of the transistors 55 to 57, the aperture control signal forming circuit OP produces an aperture control signal at the output terminal 65, from which it is applied to a diaphragm control circuit (not shown) within the camera body (not shown). At a prescribed time, therefore, the size of aperture opening of the diaphragm in the lens is caused to change depending on the object distance obtained by the preliminary illumination.

Then when the shutter release button is further pushed down, the synchro contact 43 is turned on, thereby the terminals t2 and t3 of the timer circuit T2 for main illumination are changed to and maintained at high level for a prescribed time. Such change of the terminal t3 to high level causes the known trigger circuit 22 to operate. Then, the charge on the main capacitor 41 is discharged through the flash tube 23. So the discharge tube 23 starts to emit light. Meanwhile, when the signal of high level from the terminal t2 of the timer circuit T2 is applied to the terminal t1 of the gate circuit G2, the terminal t3 of the gate circuit G2 becomes low level, turning off the transistor 61. Thereby charging of the one of the integration capacitors 58 to 60 which has been selected by the memory circuit M becomes possible. The reflection of the flash light of the flash discharge tube 23 from the object is received by the photo-sensitive element 45. The output of the photo-sensitive element 45 in the form of current is stored on the one of the integration capacitors 58 to 60 which has been selected by the memory circuit M. When the voltage stored on the selected one of the integration capacitors 58 to 60 becomes higher than the voltage at the junction point of the resistors 62 and 63, the comparator 64 produces an output signal of high level which is applied to the auxiliary thyristor 37, thereby the auxiliary thyristor 37 is turned on to reversely bias the main thyristor 36 with the charge stored on the commutation capacitor 33. The thyristor 36 is then turned off, thus terminating the firing of the flash discharge tube 23 for main illumination.

It should be noted that though the application of the signal of high level from the terminal t2 of the timer circuit T2 for main illumination to the gate circuit G1 causes the transistor 44 to turn off and the integration capacitor 46 to be charged with current flowing from the photo-sensitive element 45, the loss of the current due to the charging of the integration capacitor 46 can be neglected because the capacitance of the integration capacitor 46 is far smaller than that of any one of the integration capacitors 58 to 60.

Figure 1B:
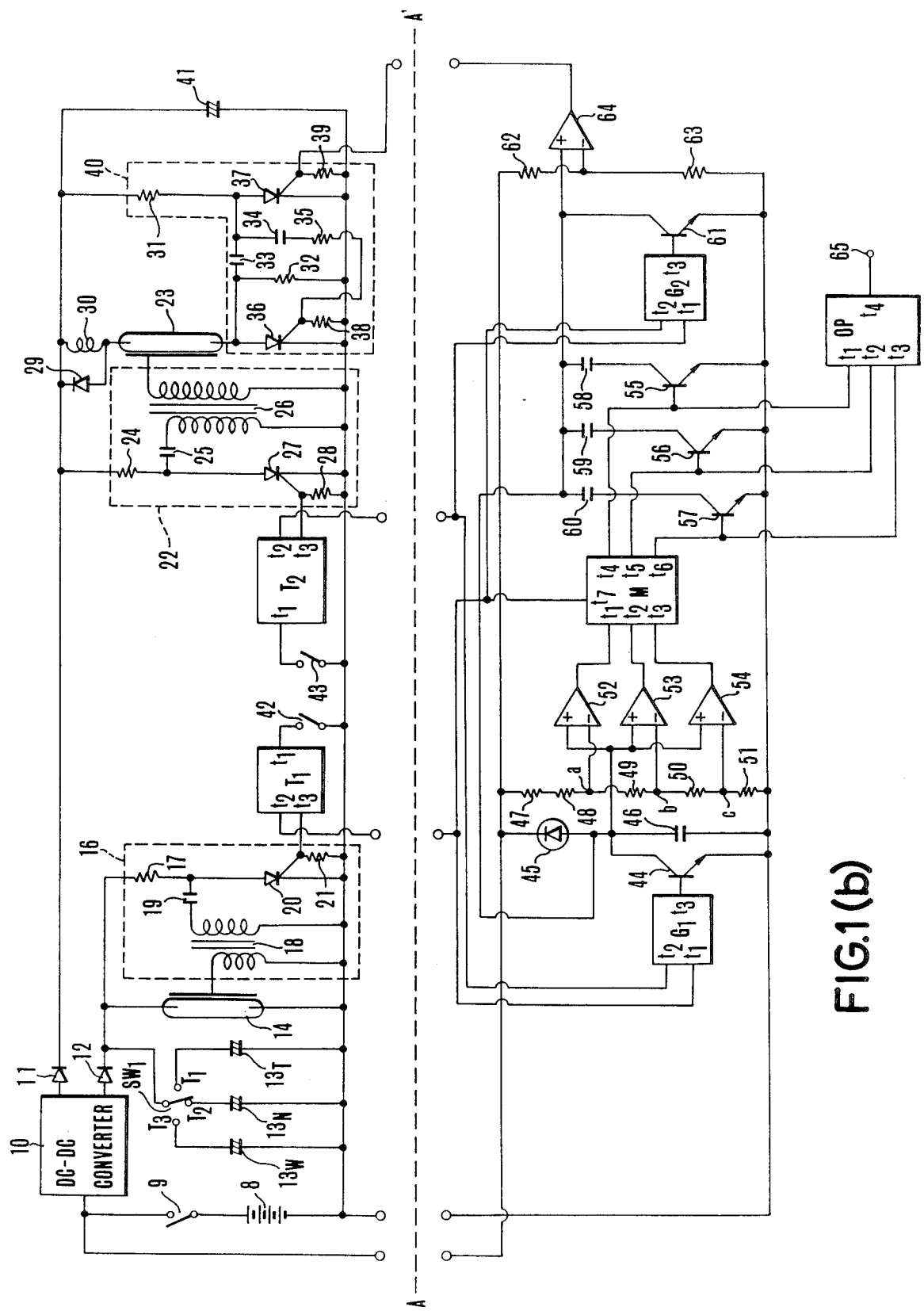
FIG. 1(b) illustrates an example of modification of the circuit of FIG. 1(a).

Alternatively, assuming that the wide angle of illumination coverage is selected, then the capacitor 13W for preliminary illumination is selected by the switch SW1. The corresponding electrical energy stored on the capacitor 13W to the wide angle of illumination coverage is emitted as flash light from the discharge tube 14 for preliminary illumination, so that the distance to the object is detected in a similar manner to that described above. In another case when the telephoto angle of illumination coverage is selected, the capacitor 13T is selected by the switch SW1. The subsequent procedure is similar to that described in connection with the standard angle of illumination coverage. Therefore, its explanation is no more given here. In this embodiment, all the consituent elements are provided in the flash device casing. But, as shown in FIG. 1(b), they may be otherwise divided into two parts at line A—A', of which the lower part is provided within the camera housing.

Also, though, in the above-described embodiment, a plurality of capacitors for preliminary illumination are selectively used, a modification may be made such that only one capacitor is provided for preliminary illumination, and the voltage to be applied to this one capacitor is made to vary with variation of the angle of illumination coverage of the main light issuing portion to effect an equivalent result to the above. Another example of modification is that while only one capacitor is used, and the voltage is maintained constant, a plurality of filters of different density are provided in front of the preliminary light issuing portion so that a proper one of the filters is selected depending on the angle of illumination coverage of the main light issuing portion. Conclusively speaking, any means can solve the object of the invention provided that the means can vary the amount of light to the object by the preliminary firing.

As will be understood from the foregoing description, in the present invention, the light amount to the object to be photographed is made to vary in response to the illumination coverage angle varying operation of the main light issuing portion so that the preset aperture value by the preliminary illumination and the electronic photographable range of the main illumination can coincide with each other. So, when in the farther distance, a small aperture value can be set in, and when in the close distance, a large aperture value can be set in. Because all what to do is only to vary the light emitting energy electrically, there is no need to provide a complicated mechanism between the main light issuing portion and the preliminary light issuing portion, giving an advantage of simplifying the structure of construction.

What is claimed is:

1. A flash exposure device having main light issuing means for producing flash light with which an object to be photographed is illuminated, and preliminary light issuing means of constant illumination coverage angle for producing flash light prior to the issuing of the main light to obtain information to be used when an exposure is made by illumination with the main light, comprising:
   (a) illumination coverage angle varying means for varying the angle of illumination coverage of the flash light of said main light issuing means; and
   (b) object light adjusting means for adjusting the object light amount illuminated by said preliminary light issuing means of constant illumination coverage angle in accordance with the preset angle of illumination coverage by said illumination coverage angle varying means.

2. A flash exposure device according to claim 1, wherein said object light adjusting means includes means for causing the capacitance of capacitors to vary.

3. A flash photography system having main light issuing means for producing flash light with which an object to be photographed is illuminated and preliminary light issuing means of constant illumination coverage angle for producing flash light prior to the issuing of the main light to obtain information to be used when an exposure is made with illumination by the main light, comprising:
   (a) illumination coverage angle varying means for varying the angle of illumination coverage of the flash light by said main light issuing means; and
   (b) object light adjusting means for adjusting the amount of object light illuminated by said preliminary light issuing means of constant illumination coverage angle in accordance with the preset angle of illumination coverage by said illumination coverage angle varying means.

4. A flash photography system according to claim 3, wherein said object light adjusting means includes means for causing the capacitance of capacitors to vary.

5. A flash photography system having main light issuing means for producing flash light with which an object to be photographed is illuminated and preliminary light issuing means of constant illumination coverage angle for producing flash light prior to the issuing of the main light to obtain information for causing an exposure to be made with illumination by the main light, comprising:
   (a) illumination coverage angle varying means for varying the angle of illumination coverage of the light by said main light issuing means;
   (b) object light adjusting means for adjusting the object light amount illuminated by said preliminary light issuing means of constant illumination coverage angle in accordance with the preset angle of illumination coverage by said illumination coverage angle varying means;
   (c) light receiving means for receiving said object light from the object with preliminary illumination by said preliminary light issuing means of constant illumination coverage angle;

(d) object information output means for producing object information based on an output from said light receiving means; and (e) main light amount setting means for setting the amount of main light of said main light issuing means in correspondence with the object information value of said object information output means.

6. A flash photography system according to claim 5, wherein said object light adjusting means includes means for causing the capacitance of capacitors to vary.

7. A flash light device having main light issuing means for producing a main flash light for an exposure, and preliminary light issuing means with a preset angle of illumination coverage for producing a preliminary light for obtaining a flash photographing information, comprising:

(a) illumination coverage angle varying means for varying an angle of coverage of the main flash light from said main light issuing means; and (b) adjusting means for adjusting an amount of preliminary light which is irradiated from said preliminary light issuing means with the preset angle of illumination coverage, said adjusting means adjusting an amount of the preliminary light issued from the preliminary light issuing means, which irradiates the preliminary light with the preset angle of illumination coverage, according to a state of the angle of coverage of the main flash light by the main light issuing means which is set by said illumination coverage angle varying means.

8. A flash light device according to claim 7, wherein said adjusting means includes a capacitance for supplying light issuing energy to said preliminary light issuing means, and make a capacity of the capacitance variable according to the state of the angle of illumination coverage set by said illumination coverage angle varying means.

9. A flash light device according to claim 7, wherein said flash light device further comprises second adjusting means for adjusting an amount of the main flash light issued from the main light issuing means based on the flash photography information obtained by said preliminary flash light.

10. A flash light device according to claim 8, wherein said flash light device further comprises second adjusting means for adjusting an amount of the main flash light issued from the main light issuing means based on the flash photography information obtained by said preliminary flash light.

11. A flash light device according to claim 7, wherein said adjusting means increases the amount of the preliminary flash light when the angle of illumination coverage set by said illumination coverage angle varying means becomes smaller than a prescribed reference angle of illumination coverage.

12. A flash photography system having main light issuing means for producing a main flash light for an exposure, and preliminary light issuing means for producing preliminary flash light with a preset angle of coverage of flash light, for obtaining an information for a flash photography by said preliminary flash light from said preliminary light issuing means, comprising:

(a) illumination coverage angle varying means for varying an angle of coverage of the main flash light from said main light issuing means; and (b) adjusting means for adjusting an amount of preliminary light which is irradiated from said preliminary light issuing means with the preset angle of illumination coverage, said adjusting means adjusting the amount of the preliminary light issued from the preliminary light issuing means, which irradiated the preliminary light with the preset angle of illumination coverage, according to a state of the angle of coverage of the main flash light by the main light issuing means which is set by said illumination coverage angle varying means.

13. A flash photography system according to claim 12, wherein said adjusting means includes a capacitance for supplying light issuing energy to said preliminary light issuing means, and makes a capacity of said capacitance variable according to the state of the angle of illumination coverage set by said illumination coverage angle varying means.

14. A flash photography system according to claim 12, wherein said adjusting means increases the amount of the preliminary flash light when the angle of illumination coverasge set by said illumination coverage angle varying means becomes smaller than a prescribed reference angle of illumination coverage.

15. A flash photography system according to claim 13, wherein said adjusting means increases the amount of the preliminary flash light when the angle of illumination coverage set by said illumination coverage angle varying means becomes smaller than a prescribed reference angle of illumination coverage.

16. A flash photography system acccrding to claim 12, wherein said system further comprises second adjusting means for adjusting an amount of the main flash light of said main light issuing means based on the flash photography information obtained by the preliminary flash light.

17. A flash photography system according to claim 12, wherein said system has aperture determining means for determining an aperture at a time the main flash light is issued based on the flash photography information obtained by the preliminary light issuing.

18. A control device for a flash photography system having illumination coverage angle varying means for varying an angle of illumination coverage, main light issuing means for irradiating a main flash light for an exposure with an angle of illumination coverage set by said illumination coverage angle varying means, and preliminary light issuing means for producing a preliminary flash light with a preset angle of illumination coverage, for obtaining information for a flash photography by the preliminary flash light from said preliminary light issuing means, comprising:

(a) adjusting means for adjusting an amount of preliminary flash light which is irradiated from said preliminary light issuing means with the preset angle of illumination coverage, said adjusting means adjusting an amount of the preliminary flash light issued from the preliminary light issuing means, which irradiates the preliminary flash light with the preset angle of illumination coverage, according to a state of the angle of coverage of the main flash light by the main light issuing means which is set by said illumination coverage angle varying means.

19. A control device according to claim 18, wherein said adjusting means increases the amount of the preliminary flash light when the angle of illumination coverage set by said illumination coverage angle varying means becomes smaller than a prescribed reference angle of illumination coverage.

* * * * *